US006891712B2

(12) United States Patent
Torr et al.

(10) Patent No.: US 6,891,712 B2
(45) Date of Patent: May 10, 2005

(54) FIELD CONVERTER

(75) Inventors: Douglas G. Torr, Fayetteville, NC (US); Jose G. Vargas, Columbia, SC (US)

(73) Assignee: PST Associates, LLC, Fayetteville, NC (US)

( * ) Notice: Subject to any disclaimer, the term of this patent is extended or adjusted under 35 U.S.C. 154(b) by 0 days.

(21) Appl. No.: 10/271,782

(22) Filed: Oct. 17, 2002

(65) Prior Publication Data

US 2005/0028998 A1 Feb. 10, 2005

Related U.S. Application Data

(60) Provisional application No. 60/329,764, filed on Oct. 18, 2001.

(51) Int. Cl.[7] .............................................. H01G 4/005
(52) U.S. Cl. ................................... 361/303; 361/306.1
(58) Field of Search ................................ 361/303–304, 361/306.1, 311–312

(56) References Cited

U.S. PATENT DOCUMENTS

| | | |
|---|---|---|
| 1,974,483 A | 9/1934 | Brown |
| 2,949,550 A | 8/1960 | Brown |
| 3,018,394 A | 1/1962 | Brown |
| 3,022,430 A | 2/1962 | Brown |
| 3,187,206 A | 6/1965 | Brown |
| 3,296,491 A | 1/1967 | Brown |
| 3,357,253 A | 12/1967 | Saxl |
| 3,518,462 A | 6/1970 | Brown |
| 3,610,971 A | 10/1971 | Hooper |
| 3,626,605 A | 12/1971 | Wallace |
| 3,626,606 A | 12/1971 | Wallace |
| 3,656,013 A | 4/1972 | Hooper |
| 3,823,570 A | 7/1974 | Wallace |
| 3,826,452 A * | 7/1974 | Little ......................... 244/160 |
| 3,980,804 A * | 9/1976 | Schneider ................... 174/73.1 |
| 4,521,854 A | 6/1985 | Rhim et al. |
| 5,109,450 A * | 4/1992 | Johann et al. ................. 385/52 |
| 5,303,117 A | 4/1994 | Ogihara et al. |
| 5,572,076 A | 11/1996 | Benecke et al. |
| 5,637,869 A | 6/1997 | Bergmann |
| 6,317,310 B1 | 11/2001 | Campbell |
| 6,411,493 B2 | 6/2002 | Campbell |

FOREIGN PATENT DOCUMENTS

| | | |
|---|---|---|
| GB | 300311 | 11/1928 |
| JP | 08-031372 | 2/1996 |

OTHER PUBLICATIONS

PCT International Search Report of PCT/US02/33217.
Datta et al., "Gravitational Experiments Involving Inhomogeneous Electric Fields," submitted to Nature magazine for publication 1999, unpublished.
Dimofte, "An Experiment Concerning Electrically Induced Gravitational Force," Masters Degree Thesis, University of South Carolina, 1999.
Vargas, J.G. et al, "The Cartan–Einstein Unification with Teleparallelism and the Discrepant Measurement of Newton's Constant G," Foundations of Physics, 29, 145–200 (1999).
R.L. Talley, "Twenty First Century Propulsion Concept", Veritay Technology, Inc. report, May 1991.
D.L. Cravens, "Electric Propulsion Study", Science Applications International Corp report, Aug. 1990.

* cited by examiner

*Primary Examiner*—Anthony Dinkins
(74) *Attorney, Agent, or Firm*—Steptoe & Johnson LLP

(57) ABSTRACT

A device for generating an inhomogeneous electrical field includes first and second electrodes. The first electrode may be a portion of a sphere, a cone, a paraboloid, a cylinder; a hollow sphere, a hollow cone, a hollow paraboloid, or a hollow cylinder. The second electrode may be a portion of a sphere, a cone, a paraboloid, a cylinder, a hollow sphere, a hollow cone, a hollow paraboloid or a hollow cylinder. The first and second electrodes are aligned to produce an inhomogeneous electric field when charged with a voltage potential and generate a gravitational effect. The second electrode may be at least partially concentric with said first electrode.

15 Claims, 10 Drawing Sheets

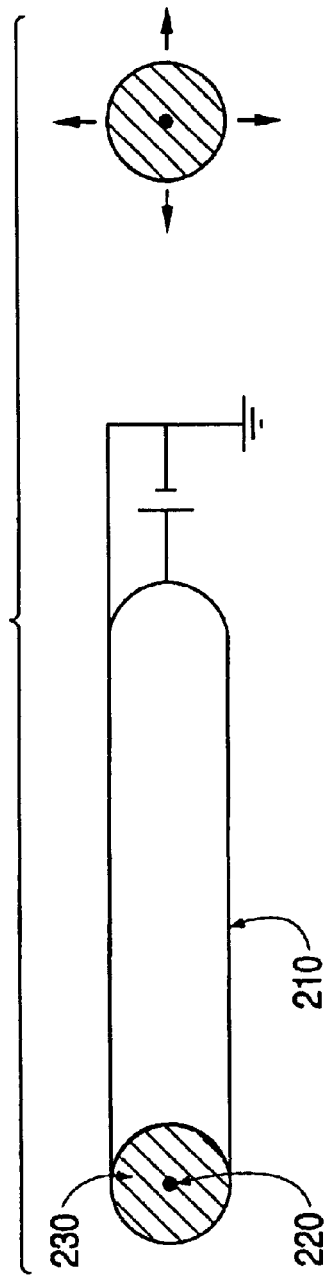
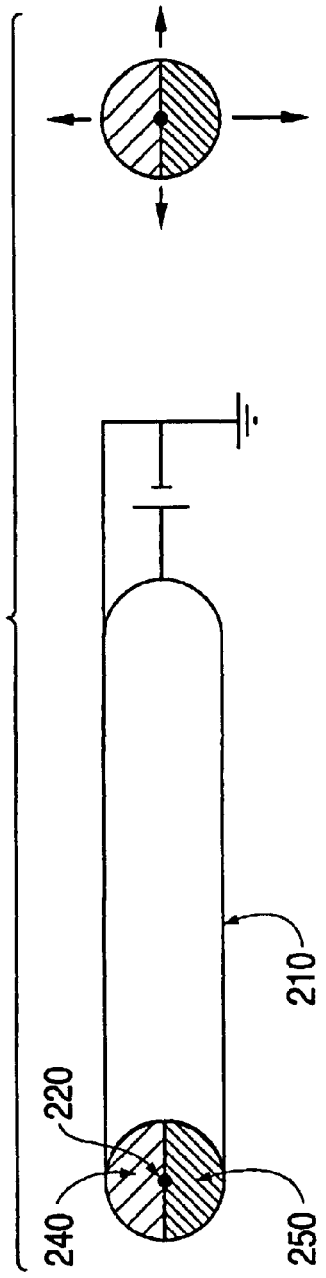

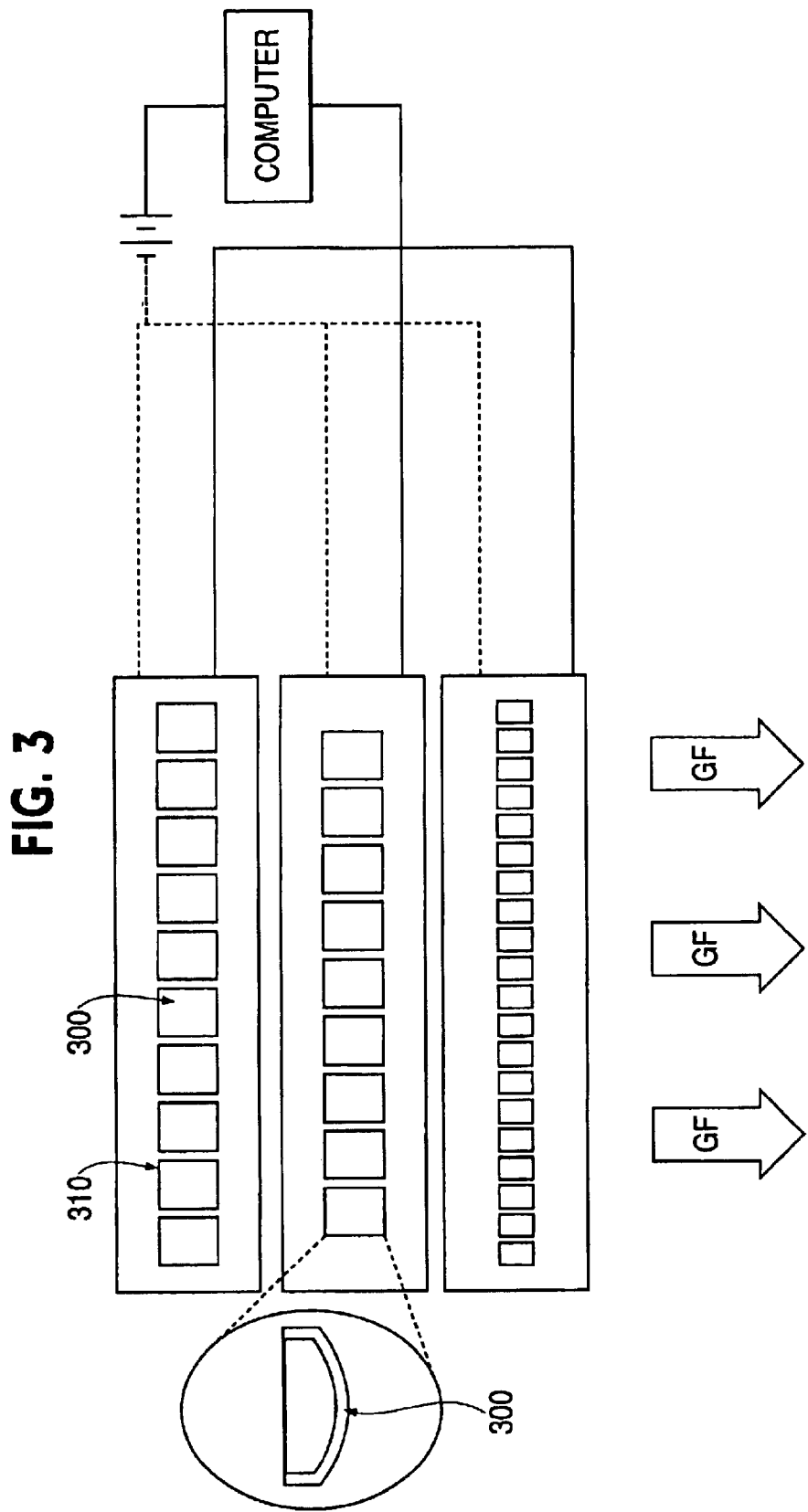

520  510

FIELD CONVERTER

This application claims the benefit of U.S. Provisional Application No. 60/329,764, filed Oct. 18, 2001.

BACKGROUND OF THE INVENTION

1. Field of the Invention

The invention relates to the generation of inhomogeneous electromagnetic fields and in particular, to the generation of fields that exert force on massive objects. Such fields have utility in the arts of mass acceleration (including object manipulation and propulsion) and communications.

2. Discussion of Background Information

All interactions in nature have been historically described in terms of four elementary forces: the strong force, the weak force, the electromagnetic force, and gravity. The strong force holds atomic nuclei together and is responsible for the energy released by nuclear reactions. The weak force is associated with radioactive decay and interactions between sub-atomic particles called neutrinos. Both strong and weak forces act over relatively short (e.g., sub-atomic) distances. The electromagnetic force can act over much longer distances than the strong and weak forces. For example, the electromagnetic force keeps directional compasses pointed north over the entire surface of the Earth. The electromagnetic force is also responsible for the attraction and repulsion of charged particles. The farthest-ranging forces are gravity and the electromagnetic force. Gravity keeps the Earth orbiting the Sun and can act over distances on a galactic scale.

An important issue in physics is the interaction of the four fundamental forces. Many physicists believe that the four fundamental forces can be described by a single unified theory. For example, the Standard Electroweak Theory explains how the electromagnetic and weak forces interact and relate to each other. The Standard Electroweak Theory unifies: the weak force and the electromagnetic force. Other theories supply explanations of how the strong force, the weak force, and the electromagnetic forces interact. Theories that harmonize all four fundamental forces are called "Super Unification" theories.

There have been reports of gravitational effects produced by devices involving various combinations of time-dependent electromagnetic and static electric and magnetic fields. Recent years have witnessed attempts to develop these technologies, as evidenced by the interest exhibited by various government agencies including NASA, DOD and the Department of Energy.

In July 2001, a three-day meeting of the American Institute of Aeronautics and Astronautics (AIAA) was held in Utah. V. Roschin and S. Godin presented a paper: *An Experimental Investigation of the Physical Effects in a Dynamic Magnetic System*. (American Institute of Aeronautics and Astronautics 2001 Meeting, AIAA-2001-3660). The paper described an assembly of static and rotating magnets, which purportedly achieved a gravitational effect. The authors reported reductions in observed weight ranging up to 35%. However, the paper gave no theoretical basis for the result.

Professor Timir Datta of the University of South Carolina and students and Professor Ming Yin of Benedict University in Columbia, S.C. claim to have observed a gravitational effect in an experiment that placed a test mass in an electric field. They reported a change in weight of up to 6.4 parts in $10^6$. An electric field was produced by an electrode pair comprised of a cone and a flat plate.

Another contribution to the theoretical understanding of gravitational and electromagnetic effects and their interrelation can be found in J. G. Vargas & D. G. Torr, *The Cartan-Einstein Unification with Teleparallelism and the Discrepant Measurement of Newton's Constant G*, in Foundations of Physics, 29, 145–200 (1999).

Unification theories often use complex mathematical ideas. In particular, attempts have been made to develop physical theories using techniques from relativity, differential geometry, phase space-time, teleparallelism, Kähler calculus, Clifford algebras, exterior differential calculus, and other physical and mathematical theories. Tensors, which are known in the art, arise in attempts to explain some physical phenomena. Tensors have components that may be n-forms (where n is an integer), functions, or other tensors. Tensors have notations involving superscripts and subscripts that are conventionally defined and understood by those of skill in the art. Differential geometry is particularly useful in studying fundamental forces and space-time. Mathematical constructs and techniques known in the art of differential geometry include matrices, connections, forms, differentials, products (including interior, exterior, inner, outer, and Clifford), metrics, contractions, contravariance, covariance, and fields.

SUMMARY OF THE INVENTION

Several arrangements of electric-field-generating systems and methods are disclosed. In particular, embodiments that produce inhomogeneous electric fields are disclosed.

Other exemplary embodiments and advantages of the present invention may be ascertained by reviewing the present disclosure and the accompanying drawings.

BRIEF DESCRIPTION OF THE DRAWINGS

The present invention is further described in the detailed description which follows with reference to the noted plurality of drawings by way of non-limiting examples of certain embodiments of the present invention, in which like numerals represent like elements throughout the several views of the drawings, and wherein:

FIG. 2a illustrates a cylindrical field converter (Vargas cell) with a single dielectric;

FIG. 2b illustrates a cylindrical field converter having non-symmetrical dielectric;

FIG. 3 is a schematic illustration of an array of cells;

FIG. 8b illustrates a cross section of the cell illustrated in FIG. 8a;

FIGS. 11b–d illustrate array shapes for field converters used in the communications system of FIG. 11a;

DETAILED DESCRIPTION OF EXEMPLARY EMBODIMENTS

1. Description of the Theory

Figure 1A:
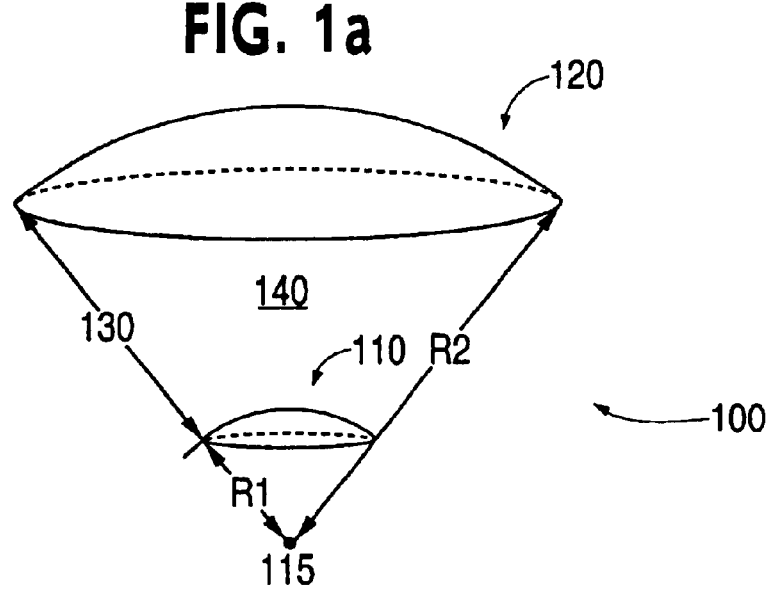
FIG. 1a illustrates a field converter with electrodes having spherical curvature (Torr cell)

The following is an abbreviated summary of the underlying theory. The equations and their relations reflect the current understanding of the disclosed phenomenon. However, those skilled in the art may practice the invention even without a full understanding of its theoretical underpinnings. That is, it is not necessary for one of ordinary skill in the art to grasp the physical theory upon which the invention is based in order to make, use, and practice the invention.

In simple terms, a charge distribution that gives rise to inhomogeneous electric fields will act as a source of a gravitational field. This will also be true for time-dependent electromagnetic fields. The theoretical relationship is set forth below.

The core relationship that provides a coupling constant relating the components of the electromagnetic (EM) field with those of the geometrical object called torsion, which also affects the curvature of space-time, is:

$$R^0{}_{\mu\nu} = -CF_{\mu\nu}R^\lambda{}_{\mu\nu} = 0 \text{ for } \lambda > 0 \quad (1)$$

where $F_{\mu\nu}$ is the EM field tensor, the $R^\lambda{}_{\mu\nu}$ terms (set to zero in general relativity) are the components of the torsion tensor for $\lambda = 0, \ldots, 3$, and C is the coupling constant given by:

$$C = (2G)^{1/2}/c^2 \quad (2)$$

in the Gaussian system. The $R^\lambda{}_{\mu\nu}$ components of the torsion tensor are vector-valued 2-forms, where $\lambda$ is the vector index (the space-time dimension) and $\mu$, $\nu$ are the differential form indices. See also, J. G. Vargas & D. G. Torr, *The Cartan-Einstein Unification with Teleparallelism and the Discrepant Measurement of Newton's Constant G*, in 29 *Foundations of Physics*, 145–200 (1999), which is incorporated herein by reference in its entirety. G is the universal gravitational constant and c is the speed of light. The relationship results from the addition, or more precisely the emergence, of a non-zero torsion term to general relativity. Such a torsion term in the context of teleparallelism permits a new derivation of the right hand side of Einstein's famous equation that relates the curvature of space to energy and momentum. The new Einstein equations retain the usual form:

$$G_{\mu\nu} = -T_{\mu\nu} \quad (3)$$

where the term $G_{\mu\nu}$ (which includes tensor indices) is the Einstein geometric tensor derived from the Riemann tensor by way of the Ricci tensor, and $T_{\mu\nu}$ is the energy and momentum tensor from general relativity, which contains the additional torsion term referred to above. Given below in equation (4) is a geometrical version of (3) that includes a term for gravitation. Equation (4) is the expression of the metric curvature of spacetime as a function of other geometric quantities that represent different physical fields. This equation is to be compared with the right hand side of (3), which is added independently in general relativity:

$$\Omega_\mu{}^\nu = (d\beta_\mu{}^\nu - \alpha_\mu{}^\lambda \wedge \beta_\lambda{}^\nu - \beta_\mu{}^\lambda \wedge \alpha_\lambda{}^\nu) - \beta_\mu{}^\lambda \wedge \beta_\lambda{}^\nu \quad (4)$$

where $G_{\mu\nu}$ is a contracted notation for (contraction of) $\Omega_\mu{}^\nu$, the Riemannian Curvature, and $\alpha_\mu{}^\lambda$ is a metric connection as in general relativity. The symbol "$\wedge$" denotes an exterior product. The $\beta$ term is the contorsion. The components of $\beta$ are linear combinations of the components of the torsion and are thus related to the EM field. That is, the $\beta$ terms can be expressed in terms of $R^\lambda{}_{\mu\nu}$ and therefore by equation (1) include the EM contributions to the right hand side of (3). Because equation (3) is a contracted version of (4), $T_{\mu\nu}$ is a contracted version of the right hand side of (4) and therefore contains the standard terms of relativity (including the electromagnetic energy tensor) in the $-\beta_\mu{}^\lambda \wedge \beta_\lambda{}^\nu$ term. $T_{\mu\nu}$ contains additional terms as a consequence of the teleparallelism approach. Equation (4) indicates that gravitational energy, in the special case of neutral matter, is a residual effect of the $d\beta_\mu{}^\nu$ term, and hence a residual effect of electromagnetic radiation. Though the $d\beta_\mu{}^\nu$ term is the derivative of the electromagnetic and other fundamental fields, embodiments of the present invention are typically concerned with the electromagnetic field. However, the invention may be made, used, and practiced without understanding the theory disclosed herein.

At this point an analogy can be made between formulas (3) and (4). A comparison between equations (3) and (4) can be obtained by expressing the right hand side of equation (4) in terms of the torsion components $R^\lambda{}_{\mu\nu}$ and gathering together the terms that correspond to $T_{\mu\nu}$ for each $\mu$ and $\nu$. Equation (4) can be expressed in terms of the $R^\lambda{}_{\mu\nu}$, which can be compared with the $T_{\mu\nu}$ from equation (3). By expressly identifying $T_{\mu\nu}$ where $\mu = \nu = 0$ (i.e., $T_\infty$) in the contraction resulting from the last term of (4) with $T_\infty$ from the theory of electrodynamics, the constant C in (1) can be determined.

The terms in parenthesis in equation (4) did not appear in Einstein's original equations. These terms account for the effects of gravity, whereas the last two $\beta$ terms account for other field forces. For reasons not necessary for the understanding of the invention, it suffices to consider only the $d\beta_\mu{}^\nu$ term. This is a new term. It can alter the metric structure of space-time, which is described by the curvature $\Omega_\mu{}^\nu$. It is the derivative of the torsion and therefore of the EM field.

The term $d\beta_\mu{}^\nu$ is the theoretical key to inducing gravitational effects. Since the derivatives of $\beta$ are linear combinations of the derivatives of the torsion, equation (1) indicates that control occurs through inhomogeneous and/or time dependent electromagnetic fields. An inhomogeneous electric field can therefore cause a variation in the gravitational force (e.g., weight) experienced by a body.

Calculations for such a theory are possible for the case of a spherically-symmetrical earth neglecting the effect of ionosphere. Id. The earth has a radial-symmetric electric field (E) of about 100 volts per meter. The inhomogeneity in this electric field would produce a change in weight of objects of less than 1 parts in $5 \times 10^{10}$. The strength of the earth's electric field is relatively small, which could account for the fact that gravitational effects have not previously been recognized. Also, the derivative of the field varies as E/R, where R is the distance from the center of the earth and E is the electric field. R is a relatively large number at the earth's surface, which greatly reduces the magnitude of the inhomogeneity of the field. The magnitude of the inhomogeneity will scale as R/r, where r would represent a sphere of arbitrary size and the E field is kept constant at the surface of the sphere. The smaller the sphere, the greater the gravitational field produced for a given E field. For example, the field generated by a charged sphere of laboratory size could greatly exceed the field generated by its mass.

2. Embodiments

The particulars shown herein are by way of example and for purposes of illustrative discussion of the embodiments of the present invention only and are presented in the cause of providing what is believed to be the most useful and readily understood description of the principles and conceptual aspects of the present invention. In this regard, no attempt is made to show structural details of the present invention in more detail than is necessary for the fundamental understanding of the present invention, the description taken with the drawings making apparent to those skilled in the art how the several forms of the present invention may be embodied in practice.

Not all inhomogeneous electric field configurations will give rise to significant gravitational fields. The present disclosure shows preferred electrode configurations that give rise to inhomogeneous electric fields capable of producing significant gravitational fields. Significant gravitational fields means at least one or more of the following:

1. Gravitational fields with strength large enough to noticeably affect a mass (preferably a force of at least 1% or more of its weight, even more preferably on the order of 10% or more of its weight, most preferably greater than its weight).
2. Gravitational fields with direction.
3. Controllable fields, i.e., fields induced by a mechanism having control and dynamic alteration of magnitude or direction.
4. Properties detectable for communications systems.

The creation of inhomogenieties, i.e., the divergence or convergence of electric field lines, can be achieved with a system of electrodes with curvature to the surfaces, e.g., spherical, cylindrical, elliptical, parabolic etc., all of which constitute various classes of inhomogeneous capacitors that can be used to create asymmetrical and inhomogeneous fields of various geometries. Spherical and cylindrical symmetries are presently preferred. However, other electrode shapes can produce significant inhomogeneous electric fields. The embodiments disclosed herein are generally designed consistent with the theory as discussed above. A Field Converter is a device that generates a significant gravitational field based on electromagnetism. Two examples of electrode systems of particular interest for field generators are (i) a properly-charged and dimensioned sphere, and (ii) electrodes with spherical curvature.

Capacitor Parameters

To create an electrical field, electricity may be passed to a capacitor with certain characteristics. The capacitor has preferably two electrodes constructed of conducting material such as a metal (e.g., aluminum, copper, silver, gold, etc.). The electrodes are in proximity of one another and may have a dielectric material interposed there between. The electrodes could also have air or a vacuum as a separating medium. The electrode system is preferably housed in an insulating material such one with a low dielectric constant. If the dielectric constant of the insulating material is low, then the dielectric constant of the material between the electrodes would preferably be high. Conversely if the dielectric constant of the insulating material is high, then the dielectric constant of the material between the electrodes would preferably be low.

The shape of the electrodes, their separation distance, the dielectric material providing separation, the applied voltage, the electrical field, and the relative position of the electrodes are parameters that affect the strength and geometric shape of the field produced.

1. Shape and Size of the Electrode Surfaces

Possible shapes for the electrodes include flat, spherical, portions of spheres (such as hemispherical), cylindrical, linear, conical, paraboloid, or other shapes. If a portion of a sphere is used, a parameter that affects field shape and strength is radius of curvature. Some electrode shapes are amenable to quantifying curvature. An electrode may be thin, plate like, and generally two-dimensional, or may be a three-dimensional solid. For example, a cone-shaped electrode may have a hollow interior or may be solid. Each electrode in a pair (e.g., those forming a cell) may have the same or different shape and size. In general, electrodes in a pair having different shapes will produce a more inhomogeneous field.

2. Separation of the Electrodes

Preferably, the electric field strength is increased in value by reducing the separation between the electrodes to just above that at which arcing or dielectric breakdown occurs. However, electrode separation may have values greater than that which would cause dielectric breakdown. The distance between two electrodes may be uniform or may vary over the surface of the electrodes.

3. Dielectric

A dielectric between electrodes can be selected to increase the voltage upper limit at which arcing occurs, resulting in larger electric fields. It can also be used to increase energy density in the capacitor. Further, a dielectric may aid in sandwiching in more electrodes in a single cell of the type shown in FIG. 1, e.g., to change a single-cell configuration from a two-electrode to a multi-electrode system. A dielectric may be oil, TEFLON™, porcelain, polymer (such as polyethylene), ceramic, mica, MYLAR™, glass, plastic, metal oxide (such as aluminum oxide), metal titanate (such as barium titanate), distilled water, air or other, mixed gasses, or a pure gas. For the purposes of discussing embodiments of the present invention, a vacuum may also constitute a dielectric material. The particular dielectric used is not limited to these examples.

Alternately, or in addition, two or more different types of dielectrics may be used in a single capacitor cell. Such an arrangement of dielectrics contributes to the inhomogeneous geometry of the induced field. Preferably, the dielectrics have similar dielectric breakdown properties. However, any two dielectrics may be used. By way of nonlimiting example, a dielectric pair of half air and half glass may be used. Preferably, a material with a high dielectric constant (a dimensionless quantity) is used in the source region (the region between the electrodes), and a material with a low dielectric constant is used elsewhere. That is, preferably the source region should include a material that maximizes the field, while materials capable of minimizing the field are used elsewhere. To accomplish this, the source region contains a material having a dielectric constant of up to four orders of magnitude greater than the dielectric constant of the material elsewhere (e.g., source region material having a dielectric constant of 10,000, and the other material having a dielectric constant of 1).

Dielectric materials are available from several suppliers. KYNAR™ (PVDF), having a dielectric constant of about 9, is available from McMaster-Carr Supply Co. Barium titanate, having a dielectric constant of several thousand, is available from Channel Industries, Inc.

4. Applied Voltage

The strength of the gravitational field can be controlled externally by varying the voltage applied across the electrodes. Preferably, the voltage obtains values just under that which would cause arcing or dielectric breakdown. Voltages under this threshold may also be used. The particular voltage will at least partially depend on the character of the dielectric or lack thereof, the distance between the electrodes and their geometric configuration, and, as discussed further below, the desired electrical field. The embodiments discussed herein may receive voltage values of, byway of non-limiting examples, 0.001, 0.01, 0.1, 1, 10, 100, 1000, 10,000, 25,000, 50,000, 75,000, 100,000, 250,000, 500,000, 750,000 and 1 million volts. Voltage polarity also affects the direction of the gravitational field.

5. Electrode Orientation

The relative position and orientation of the electrodes is also a factor in capacitor construction. One parameter that affects the field generated is the total volume between electrodes. The electrodes may be generally parallel, or may be skewed with respect to each other.

6. Shielding

Electrical shielding is obtained by encasing one electrode of a pair within a conducting member electrically connected to the other electrode. If the shield casing is grounded, a positive or negative voltage can be applied to the shielded center electrode thereby improving the safety of the system and reducing electromagnetic emissions. All of the single cell embodiments are configurable to have such shielding. The array embodiments, discussed further below, may employ a separate shield for each cell, or a single shield for all of the cells. Shielding effectively provides a Faraday cage, which prevents substantial amounts of electromagnetic radiation from emanating from the capacitors while allowing the induced gravitational field to project out of the cell and beyond the shield.

Electrical shielding also substantially prevents ion wind from interfering with the gravitational field effects. Ion wind can result in situations when a large potential difference exists between two exposed electrodes. In that situation, it is possible for charged particles (e.g., electrons or ionized air molecules) to flow between the two electrodes thereby causing an inertial force. By enclosing one charged electrode within another kept at ground, the effect of ion wind is substantially eliminated. This ensures that the force produced is exclusively a result of the produced gravitational field. Nonconductive barriers are not effective in preventing ion wind.

7. Electrical Field Strength

Electrical field is a measurement of electrical potential difference per unit of length. For the present purposes, electrical field is measured in volts per millimeter (V/mm). AL electrode pair having a separation distance between the electrodes of two millimeters connected to a 20,000 volt source will have a electrical field between electrodes of 10,000 V/mm. Similarly, an electrode pair with a potential difference of 10 volts having a separation gap of one micrometer will also have a electrical field of 10,000 V/mm. Electrical field for a given electrode pair is a function of separation between the electrodes and the voltage supplied by the electrical source.

Once a size and geometric configuration is selected for a cell or array, the voltage is selected to achieve a preferred electrical field. For cells having dimensions on the order of nanometers, voltages are typically on the order of tens of millivolts. For cells having dimensions on the order of micrometers, voltages are typically on the order of tens of volts. Preferably, the embodiments disclosed herein have an electrical field of between 10 and 100,000 V/mm. More preferably, the disclosed embodiments have a electrical field of about 10,000 V/mm. Other preferred linear charge densities (electric field strengths) include 2500 V/mm, 5000 V/mm, 7500 V/mm, 25,000 V/mm, 50,000 V/mm, 75,000 V/mm, 100,000 V/mm, and up to 200,000 V/mm.

8. Fabrication

Standard fabrication techniques may be used for many of the embodiments discussed herein. For example, some of the capacitors may be constructed on standard or specially shaped, preferably fiberglass, printed circuit boards. The electrodes in the printed circuit board embodiment are formed from metal cladding on the board. Specialized circuit boards having thicker or thinner width may also be used. Micromachining may be used to produce electrodes in printed circuit board and other embodiments. For the smaller cells and arrays, known thin-film deposition techniques may also be used. Both conducting materials, insulating materials, and various dielectric materials may be formed using these techniques. Alternately, or in addition, X-ray etching with appropriate masking and chemical wash could be used to generate electrodes and insulators with the desired properties. Any of the known techniques of fabricating integrated circuits may be used to construct the smaller embodiments disclosed herein. As nanotechnology matures, still other fabrication techniques will become known and may be used.

The Charged Sphere

The electric field of the charged sphere is radial and therefore spherically symmetric. The spherical symmetry in turn produces a gravitational field with spherical symmetries. The electric field, E, of the charged sphere will decrease as $1/r^2$, where r is the distance from the center of the sphere. The derivative of the field scales as $E/r$ where r is distance from the center of the sphere. Depending on the sign of its charge, the charged sphere would generate a gravitational force that would act to either attract or repel massive objects to or away from the center of the sphere. One use of such generators is as a device for producing, measuring and demonstrating gravitational effects and their principles. Other uses include any applications useful for applying forces to massive objects, and communications.

Capacitors with Spherically Curved Electrodes

FIG. 1a illustrates a capacitor 100 involving two spherically curved electrodes 110, 120 with radii of curvature $R_1$ and $R_2$ respectively that will act as a source of an inhomogeneous electric field. Each radius of curvature originates at the center 115 of the (imaginary) sphere of which the electrode is part, and terminates at the electrode. The electrodes may form portions of concentric spheres (i.e., the centers of the two spheres may coincide). Alternately, the centers of the spheres of which the electrodes form portions may be spaced apart. For certain applications involving only a one electrode pair system the radius $R_2$ of the outer electrode may need to be as large as possible having a value at least as big as 5 meters. The dimensions of the inner radius $R_1$ may be about the same as that of $R_2$, or may be much smaller. For other applications the $R_1$ and $R_2$ may be similar ranging from a decameter to several tens of microns, always with $R_2 \geq R_1$. In some embodiments, $R_1$ and $R_2$ may be less than several tens of nanometers. However, $R_1$ and $R_2$ may range up to several meters.

The face view of the electrodes could be round or rectangular or any shape that can accommodate spherical curvature. If the electrode has an approximately circular face, depending on the application and the radii of curvature, it may need to be several meters across, or several centimeters or millimeters across, and most typically several tens of microns across. In some embodiments, the electrodes may be several nanometers across. If the face of an electrode is a square, rectangle, triangle, or other polygon, the electrode may similarly have a side measurement in the range of several meters, or several millimeters and most typically several tens of microns, again depending at least in part on the radius of curvature and the application. In some embodiments, such electrodes may have a side measurement of less than several tens of nanometers. The surface area of the face of the electrode is partly dependent on the radius, but depending on the particular application, may need to be several tens of square meters, or several square millimeters and most typically several thousand square microns. In some embodiments, the surface area of the electrode faces may be less than several tens of square microns.

The direction of the majority of the electric field is radial and its source is generally contained within the region 140 defined by the surface enclosing the perimeters of the two electrodes. Though the cells disclosed herein radiate gravitational fields in all directions, the field may be concentrated in certain direction(s) by arrangement of the electrodes and usage of high dielectric constant material in the source region. As used herein, the phrase "the field" or the like refers to the directional portion of the field having the highest concentration. The emerging field is a portion of the omni-directional radial field of the spherical system. Because of the link of the configuration to that of the sphere, the gravitational field source region 140 will exhibit roughly the same symmetries as the electric field. Since gravitational fields are not attenuated by material boundaries in general, the field will propagate away from the source region 140 retaining the original directional signature of the source region. This electrode configuration shall be called the "conic cell".

The gap 130 between the two electrodes is preferably less than one meter (but may be greater), more preferably less than one millimeter, and most preferably less than several tens of microns. In some embodiments, the gap 130 between the electrodes is less than several tens of nanometers. The voltage range applied across the electrodes depends at least in part on the dielectric used. The voltage range is preferably one millivolt to ten thousand volts, more preferably one hundred volts to 1,000,000 volts, and for some potential applications preferably up to hundreds of millions of volts. Preferably, the voltage is selected so that for the particular cell size and geometric configuration, the electrical field strength is between 0 and 100,000 V/mm. More preferably, the voltage for a particular cell configuration is selected such that the electrical field strength is about 10,000 V/mm. By way of non-limiting example, an electrode gap of 10 nanometers would require a 0.1 volt potential to achieve a 10,000 V/mm electrical field strength.

The derivative of the E field scales as E/r, where r is the approximate radius of the electrodes, so field strength increases as r decreases, i.e., larger curvature yields a larger gravitational field. In other words, smaller radii of curvature yield larger gravitational fields.

Alternatively, if the smaller electrode is placed close to the origin of the radius of curvature r, the derivative of the field with respect to r increases significantly in the vicinity of the surface of the electrode because of the small values of r there.

The volume of the cell formed may be a significant factor in deciding the total strength of the resultant gravitational field, which would suggest locating the inner electrode close to the origin of the radius of curvature and increasing the dimensions of the capacitor.

Whether the field points outward or inward toward the point of origin of the radius of curvature depends on the polarity of the potential difference applied across the electrodes.

Figure 1B:
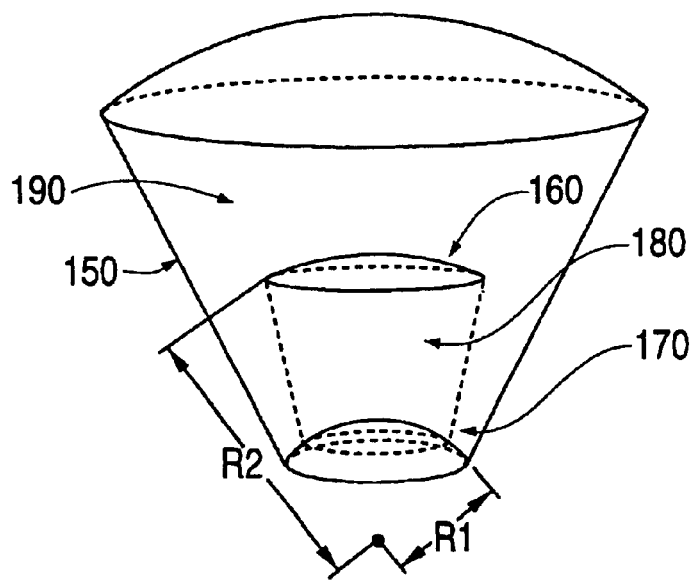
FIG. 1b illustrates a shielded Torr cell.

FIG. 1b illustrates a conic cell having shielding 150 around center electrode 160. Shielding 150 is electrically connected to and forms part of electrode 170. Electrode 170 corresponds to electrode 110 in FIG. 1a, and electrode 160 corresponds to electrode 120. That is, the "inner", or center electrode of FIG. 1b corresponds to the "outer" electrode of FIG. 1a. As in FIG. 1a, $R_2 \geq R_1$. Electrode 160 typically receives positive or negative charge, while electrode 170 and shielding 150 is typically held at ground. A first dielectric is used for the source region 180, and a second dielectric, which servers to isolate the cell from any adjacent cells, is used in the remaining interior 190 of the cell. Preferably, the dielectric constant of the material in the source region 180 is much greater (e.g., one, two, three, or four orders of magnitude) than the dielectric constant of the remaining material 190. The dimensions, voltages, and linear charge densities (electric field strengths) are the same as those discussed above in reference to FIG. 1a.

Fabrication of the cells illustrated in FIGS. 1a and 1b may be accomplished by a variety of known techniques. For larger cells, standard machining techniques may be used. Alternately, or in addition, the cells may be constructed using off-the-shelf components. For smaller embodiments, micromachining, thin film, vapor deposition, or other integrated circuit fabrication techniques may be used.

Cylindrical Cells

FIGS. 2a and 2b illustrate cylindrical cells viewed longitudinally and in cross section, the latter illustrating induced gravitational fields using arrows. This electrode configuration, the "pipe configuration", resembles co-axial cable in that it comprises two cylindrical electrodes. These could be two pipes: an outer electrode 210 of larger diameter enclosing an inner one 220 of smaller diameter. Alternatively, the inner electrode 220 could be a solid wire running down the central axis of an outer pipe 210 of symmetry as illustrated in FIG. 2a. The radius of the outer electrode 210 for some applications may need to be several meters. Other applications may require smaller radii, preferably of several centimeters or millimeters and most typically less than several tens of microns. In some embodiments, the radii of outer electrodes 210 are less than several tens of nanometers. The inner electrode 220 must have a smaller radius than the outer electrode 210, ranging from several meters to several tens of microns, or even less than several tens of nanometers. Using a wire with small radius for the inner electrode 220 results in large values for the derivative of the electric field in the vicinity of the wire because of the small values of radius of curvature r there. Ideally the radius of the wire would be made as small as 25 microns. The radius of the wire may be smaller (e.g., several tens on nanometers) or could be larger. The length of such a configuration is preferably in the range of millimeters to several tens of meters. The length is limited only by the particular application and can be longer. A voltage is applied between the outer 210 and inner 220 electrodes at the end of the pipe. The magnitude of voltages is similar to those referred to above with regard to FIG. 1a. Preferably, the electrical field strength is about 10,000 V/mm. More preferably, the electrical field strength is between 0 and 100,000 V/mm. The direction of the electric and gravitational fields will be cylindrically radial, thereby satisfying in two dimensions similar symmetry conditions used for the calculations for the three dimensional spherical case.

Some advantages of the pipes/wire approach are:

1. The fact that the inner electrode 220 is completely shielded electrically by the outer electrode 210 essentially eliminates possible electrostatic coupling with other potential surfaces, which is relevant to the discussion of arrays below.

2. In addition they are relatively safe in that high voltages can be applied to the shielded electrode 220.

A single dielectric or multiple dielectrics may be used in the pipe configuration.

FIG. 2a shows a configuration with a single dielectric 230. Greater versatility is obtained if a dielectric is introduced to produce asymmetries in the resultant gravitational field. In an embodiment as illustrated in FIG. 2b, two different dielectrics 240, 250 are used in a single cylindrical cell. Appropriate introduction of two or more types of dielectric material in a single cell can be used to reduce or increase the gravitational field in selected directions, providing the basis for direction and control of the field. A material 250 with a high dielectric constant would maximize the emerging field, while a material 240 with a low dielectric constant minimizes the field. The shape of the dielectric is not limited to that shown in FIG. 2b. The angle formed by the dielectric as seen in a cross section of the cylinder may range from less than or equal to 180 degrees to even more preferably less than several tens of degrees and most preferably less than several degrees, measured with the inner electrode at the apex. The emerging gravitational field will be concentrated within the angle defined by the material having high dielectric constant. The dimensions, voltages, and linear charge densities of the cell illustrated in FIG. 2b correspond to those discussed above in reference to FIG. 2a.

The embodiments of FIGS. 2a and 2b may be constructed in a variety of ways. For the larger embodiments, off-the-shelf tubing may be used. Both the electrodes and the dielectric materials are amenable to such construction. Alternately, or in addition, parts may be extruded, molded, or machined using standard methods. For smaller embodiments, micromachining, thin film, vapor deposition, or other integrated circuit fabrication techniques may be used.

As discussed further below, assembling an array of pipes can create more powerful gravitational field configurations.

The configuration shown in FIG. 2a was used to test the theory described herein. Specifically, a pipe cell was fabricated according to the following parameters. The inner electrode had a diameter of 1 mm. The plastic dielectric material had an outer diameter of 6 mm and a channel to snugly hold the inner electrode. The dielectric material had a dielectric constant of about 3. The assembled pipe cell was about 2 ft long. Aluminum foil was formed into a tube having an inner diameter of 6 mm, and was used for the outer electrode. A 30,000 volt power supply was connected to the pipe cell, generating a electrical field strength of about 10,000 V/mm. A Honeywell QA1400 accelerometer was electrically isolated from the pipe cell and shielded in a copper pipe Faraday cage. The accelerometer aperture was positioned near the center of the pipe. The experiment resulted in readings of about 120 nano-g's with a signal to noise ratio of between 5 and 10.

Conic Cell Arrays

FIG. 3 shows a conceptual layout which will be called a "Torr Array" with arrows to depict the induced gravitational field. This illustration depicts a schematic structure of electrode-pair cells in a lattice configuration, each cell producing a gravitational field with desirable characteristics. The positioning and number of cells as illustrated in FIG. 3 is exemplary only; other arrangements and quantities of cells in such an array are also possible. Ideally, in constructing the lattice, the radii of curvature and the area of each cell electrode system should be minimized, however, other configurations are possible. The area lost per cell by reducing cell size is offset by adding more cells. The arrangements depicted in cross section in FIG. 3 is not limited to conic cell arrays; other cells including but not limited to cylindrical and conic mirror cells (described below) may be used.

The sizes of the conic cells 300 used in the upper level are preferably of the order of tens of microns to several centimeters. As depicted in FIG. 3, preferably the lower levels enclose cells 300 with smaller dimensions than those enclosed in the upper levels. Various cell sizes may be used depending on the particular application or to produce certain desirable characteristics in the beam such as less granularity.

The separation between the cells 300 can vary from several nanometers to several meters. In some embodiments, the outer cell casings 310 may touch or adjacent cells may share casings. The intercellular distance is preferably less than one centimeter, more preferably less than one millimeter, and most preferably less than tens of microns.

By making each electrode small (e.g., near the lower end of the ranges described herein), the actual surfaces will approximate a system of flat electrodes without losing curvature. Such a configuration would not only reduce edge effects that could otherwise introduce spurious electric fields, but would also produce a gravitational field with a beam-like characteristic. The housing and lattice support materials may be insulators designed to electrically isolate one cell from another to eliminate or reduce cross coupling of electrodes and connecting wires, as well as provide directionality to the gravitational field. Cells could be activated individually, in groups or en masse. There are preferably as many as a billion, more preferably as many as $10^{12}$, and most preferably as many as $10^{15}$ such cells in an array. In some embodiments, 1,000 or more cells will suffice.

In one embodiment, the housing and lattice support may be electrically conductive. This embodiment is suited for implementing shielded conic cells such as that illustrated in FIG. 1b. Other cell types implementing shielding may be used in arrays having electrically conductive housing and lattice support. In shielded cell embodiments, the housing typically forms part of the shield and is electrically connected thereto.

The voltages, dimensions, geometric configurations, and linear charge densities correspond to those discussed above in reference to the single conic cell of FIGS. 1a and 1b.

The embodiment FIG. 3 may be constructed in a variety of ways. For the larger embodiments, off-the-shelf materials may be used. Both the electrodes and the dielectric materials are amenable to such construction. Alternately, or in addition, standard custom extruded, molded, or machined parts may be used. For smaller embodiments, micromachining, thin film, vapor deposition, or other integrated circuit fabrication techniques may be used.

The Gravitational Lens

Figure 4:
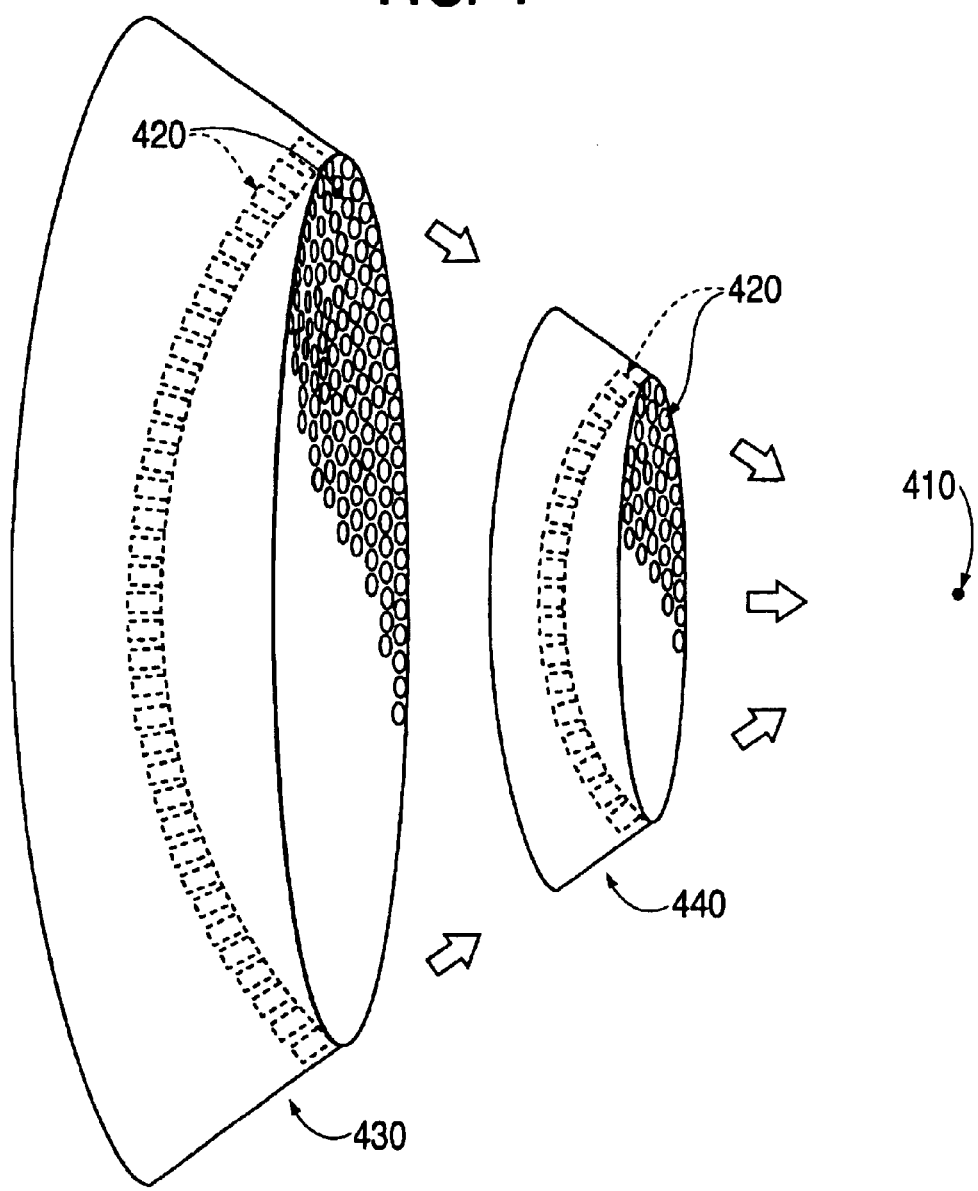
FIG. 4 illustrates a gravitational lens.

FIG. 4 is a schematic diagram of a gravitational lens, illustrating the gravitational field using arrows. Gravitational energy may be concentrated at a specific location 410 by creating a lattice structure of cells 420 with a curvature to each layer 430, 440 in the structure. FIG. 4 illustrates two separated layers 430, 440. Each layer has an array of individual cells 420 positioned along a curved surface, which may be a portion of a sphere or paraboloid. According to another embodiment, layers 430, 440 are stacked directly without gaps between them. There may be from one to several tens of layers. Curvature of various types in the array surface could meet a variety of application needs.

FIG. 4 depicts a spherical curvature designed to focus the gravitational field at a point 410. The gravitational field lines follow a conical pattern with the point 410 at its apex. Each layer 430, 440 comprises a portion of one of two concentric imaginary spheres with point 410 at their mutual center. According to alternate embodiments, the focus location of the gravitational lens could be a line segment, a line, a region, or any other geometrical portion of space. We describe a means of making the location programmable below. In choosing the gravitational lens geometry to accomplish a given focus location, the analysis is similar to that for achieving a focus location for light with traditional glass lenses.

The particular cell parameters (e.g., voltages, geometric configurations, dimensions, spacing, linear charge densities) are discussed elsewhere herein in the sections detailing particular cell types. Cells 420 may comprise conic cells, cylindrical cells as discussed below, or any other cell type according to the disclosed embodiments.

Cylindrical Cell Arrays

Figure 5:
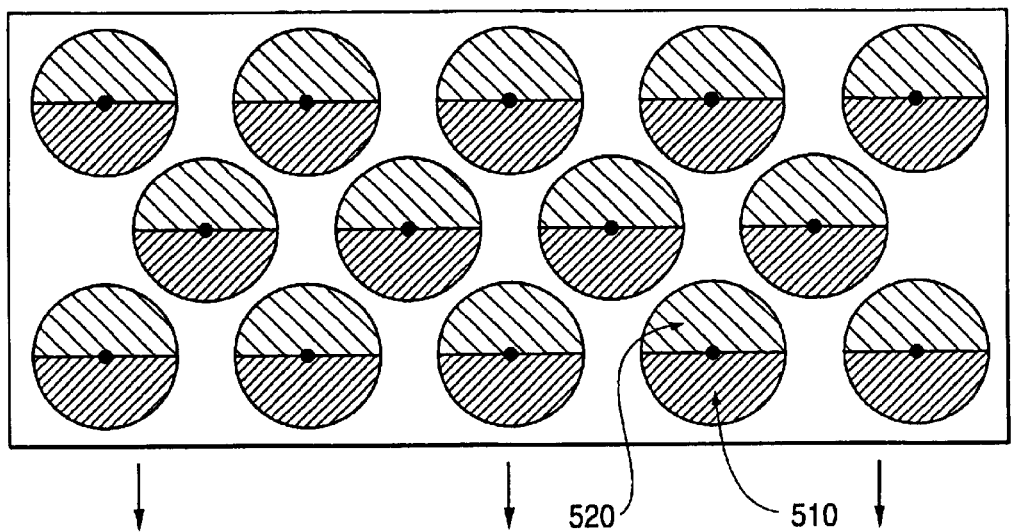
FIG. 5 illustrates a Vargas Array.

FIG. 5 illustrates a two-dimensional cut through a three-dimensional pipe array with an example of how two dielectrics 510, 520 could be inserted to obtain a specific configuration of the resulting gravitational field (depicted by arrows). The structure, a Vargas Array, could be an assembly of parallel pipes, holes drilled in a metal block, or other arrangement of pipes. For certain applications just one such cell may suffice, but some applications would require at least 100 thousand, and most applications most preferably more than 100 million or more. An advantageous feature is the absence in the array itself of any connecting wires, except for the inner electrodes. Furthermore, there is no potential (i.e., voltage) difference between any external electrode, thereby eliminating possible inter-coupling of electrodes.

The dimensions, linear charge densities (electrical field strengths), and applicable voltages of the individual cylindrical cells are as described above in reference to the individual cells of FIGS. 2a and 2b. The intercellular distance would depend at least in part on the dimensions of the cells, but are preferably less than tens of meters, more preferably less than several millimeters, and most preferably several tens of microns. In some embodiments, the intercellular distance may be less than several tens on nanometers, or the cells may touch.

The gravitational beam generated by a single cell exhibits no angular spread outside the plane of symmetry. However, the angular spread in the plane of symmetry would be 360 degrees in the absence of a dielectric. The angular spread of the field generated by the array of pipes may be reduced by choice of the array dielectric properties and the array structure so that unwanted vectors would be canceled out.

Figure 6:
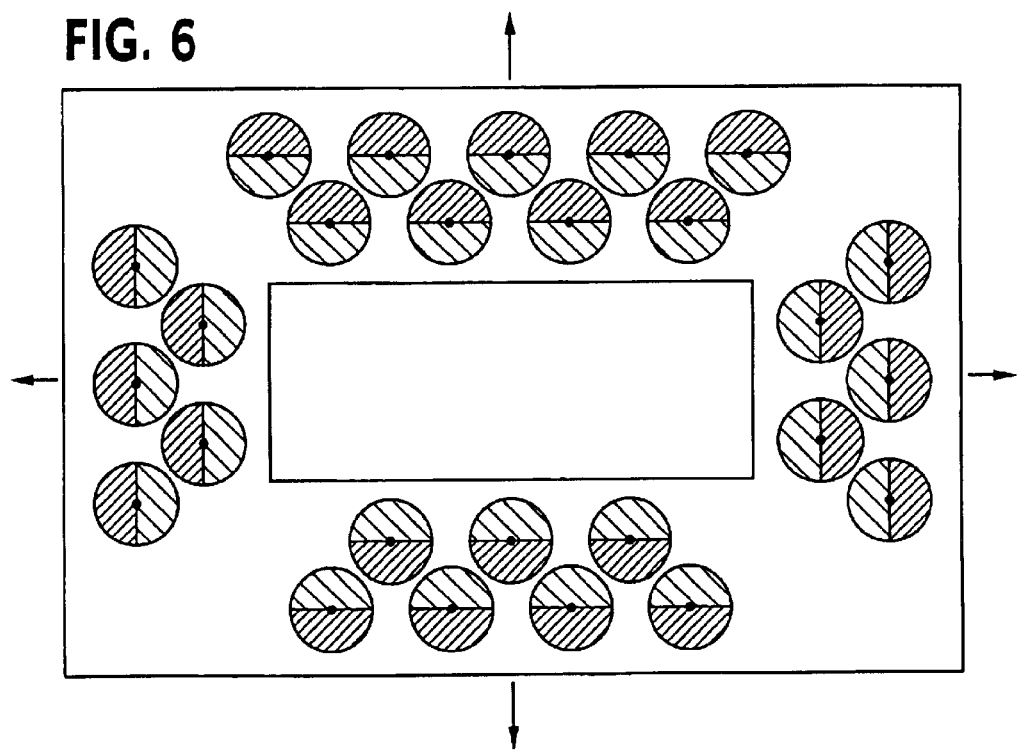
FIG. 6 illustrates a Vargas Engine.

FIG. 6 shows how the pipes can be assembled in a configuration that would serve as a multidirectional engine, referred to here as a "Vargas Engine". The sub arrays are activated to generate a force in any one of six directions normal to the sides of the cubic array. (Four of six sides are illustrated in FIG. 6.) The force may be directed away from or into each side. The spread angle for the field in any one of the directions indicated is technically 180 degrees, but it could be reduced as mentioned above. The applicable voltages, linear charge densities (electric field strengths), intercellular distances, and general dimensions are described above in reference to FIGS. 2a, 2b, and 5.

Cylindrical Mirror Cells—A Combination of Pipe and Conic Cells

Figure 7:
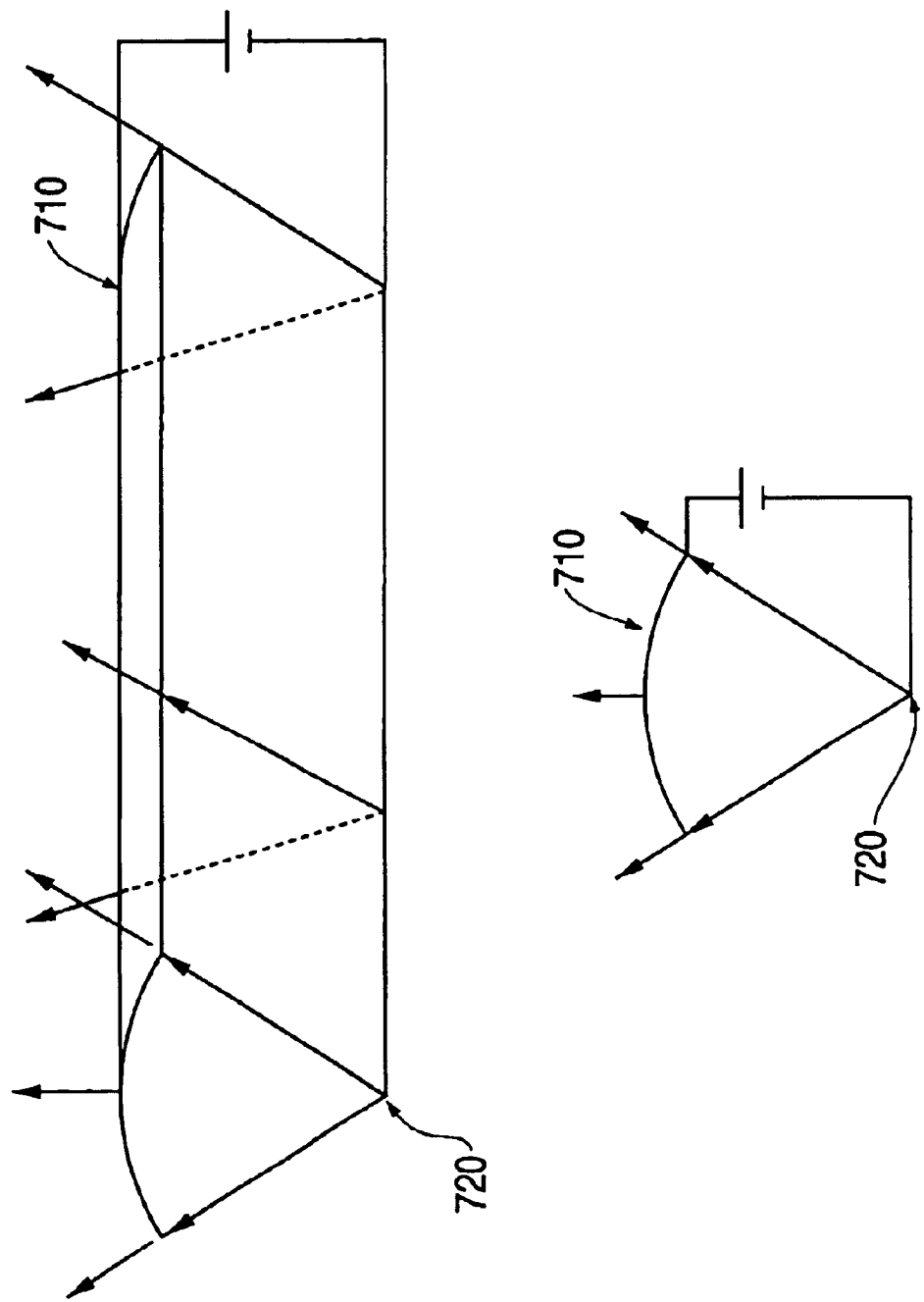
FIG. 7 illustrates a cylindrical mirror cell with a cylindrical and an arcuate segment electrodes.

FIG. 7 illustrates a longitudinal and cross-section views of a cylindrical mirror design. This configuration utilizes features of the conic and pipe designs. Using only a small angular segment 710 of the outer pipe in the plane of symmetry reduces angular spread. The angle is preferably in the range of 30 to 180 degrees, more preferably in the range of 10 to 30 degrees, and most preferably in the range of less than ten degrees.

Preferable lengths are in the range of 1 to 10 millimeters, more preferably in the range of 1 to 10 centimeters, and most preferably in the range of 10 centimeters to hundreds of meters. This could replace the conic electrodes down the entire length of the array illustrated in FIG. 3, which reduces edge and coupling effects resulting from connecting wires, because the only electrical connections to the cell are at the very end of the array. The inner electrode 720 could be a wire or cylinder placed at the origin of the radius of curvature of outer electrode 710, or it could be an inner cylindrical segment placed anywhere between: the origin of the radius of curvature and the outer electrode. That is, the inner electrode 720 may be a cylinder or an arcuate segment. The radius of an inner cylinder electrode 720 (or cylinder of which the arcuate segment may be part) is preferably in the range of 1 to 100 centimeters, more preferably in the range of 1 to 10 millimeters and most preferably in the range of less than one millimeter. In some embodiments, the radius of the inner electrode cylinder 720 (or associated cylinder, for an arcuate segment) may be less than several tens of nanometers. The radius of the outer arcuate cylinder electrode 710 is similar to and larger than that of the inner electrode. The distances between the electrodes are similar to those discussed above with respect to the conical cell, that is, preferably less than one meter (but may be greater than one meter), more preferably less than one millimeter, and most preferably less than several tens of nanometers. The voltages and linear charge densities are similar to those referred to above with regard to FIGS. 1a and 1b. The main advantages of this electrode configuration are:

1. A gravitational beam could be generated that would vary in strength with distance r as $nr_o/r$, where $r_o$ is the radius of curvature of the outer electrode, and n is the number of pipes across one side of the array. A system could comprise just one such cell, more preferably up to 1,000,000 and most preferably up to one billion or more.
2. A reduction in angular spread.
3. Improved directional characteristics relative to the conic cell.

If a larger spread is desired without degradation in the 1/r loss law, cells could be assembled in an arc with the desired curvature. These would comprise an assembly of linear segments. Both cylindrical mirror and cylindrical cells could be used. One application would be for communications, where the 1/r loss dependence would be a design criterion for practical applications.

Figure 8A:
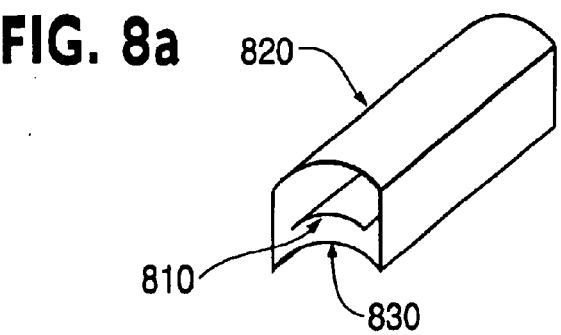
FIG. 8a illustrates a cylindrical mirror cell having a conductive shield and two arcuate segment electrodes.
Figure 8B:
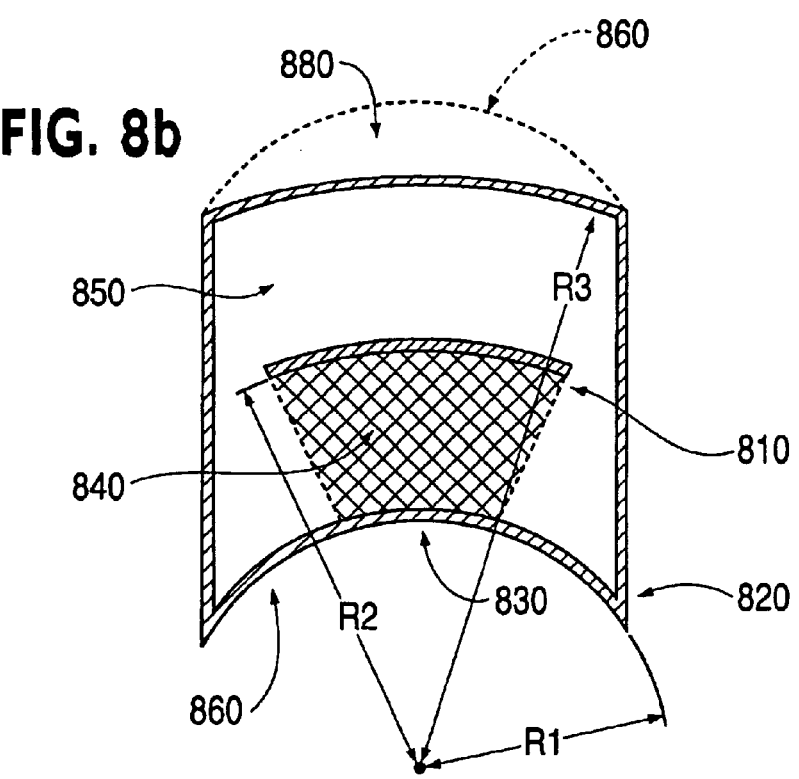

FIG. 8a illustrates a cylindrical mirror cell having a conductive shield 820 and two arcuate segment electrodes 810, 830. FIG. 8b illustrates a cross section of the cell depicted in FIG. 8a. In this embodiment, the inner electrode 810 with radius of curvature R2 is enclosed in an electrically conductive member 820. The other electrode, with radius of curvature R1, comprises a portion of the shield 830. The outer portion of the shield has radius of curvature R3. Curvature is preferably minimized on the remaining parts of the shield (i.e., those not part of the outer electrode 830). Any fields generated by the corners are reduced by embedding the source region 840 in an insulator 850 with low dielectric constant. The source region 840 preferably contains material of high dielectric constant. As discussed earlier, the outer shield may be held at ground while providing positive or negative voltage to the inner electrode. The main advantages of the cellular mirror configuration are:

1. Shielding substantially reduces electrostatic coupling between charged electrodes in different cells.
2. Very high voltages may be applied to the shielded electrode in a relatively safe manner.
3. The layer design of the cell structure may be manufactured using, by way of non-limiting example, standard techniques or thin film deposition.

Figure 8C:
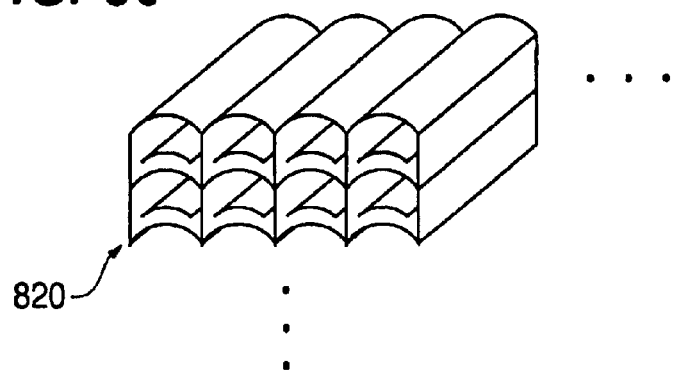
FIG. 8c illustrates an array of cylindrical mirror cells.

FIG. 8c illustrates a stacked array of cylindrical mirror cells. In this embodiment, the bottom surface 860 of one cell may abut the top surface 880 of another cell (see FIG. 8b). The entire shield 820 is preferably electrically connected to ground. The electrical and geometric parameters are otherwise the same as those discussed above for the single cylindrical mirror cell of FIG. 8a.

The cylindrical mirror embodiments of FIGS. 8a–c may be constructed in a variety of ways. For the larger embodiments, off-the-shelf materials may be used. Both the electrodes and the dielectric materials are amenable to such construction. Alternately, or in addition, standard custom extruded, molded, or machined parts may be used. For smaller embodiments, micromachining, thin film, vapor deposition, or other integrated circuit fabrication techniques may be used.

The Gravitational Beam

Figure 9:
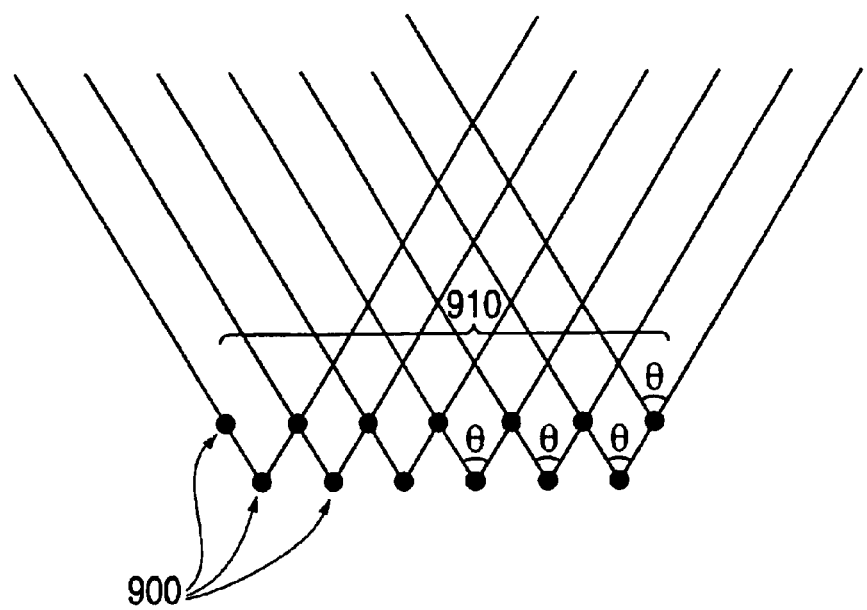
FIG. 9 is a schematic diagram of a two-dimensional cut through a three dimensional lattice of cells.

The intensity of the gravitational effect may be concentrated by selecting cells having anisotropic characteristics and by forming lattices. FIG. 9 is a schematic diagram of a two-dimensional cut through a three dimensional lattice of cells. This lattice configuration produces a gravitational beam, some features of which are described presently. As used herein, the term "gravitational beam" connotes both fixed beams and beams whose intensity varies over time such as those used for communications as discussed further below. The embodiments used to generate a gravitation beam may employ conical cells, cylindrical cells, cylindrical mirror cells, or any of the other cell types disclosed herein having an anisotropic characteristic. Note that all of the cell designs disclosed herein create a gravitational field in all directions; the beam is concentrated in certain directions by arrangement of the electrodes and the dielectric material(s). Each dot 900 in FIG. 9 represents one cell of a type described herein. Lines emerging therefrom represent the concentrated portion of the beam diverging from the cell. The symbol θ represents the angular divergence of (the majority of) the beam from an individual cell. Hence, θ will depend on at least the particular cells used, their electrode arrangements, and the arrangement of the dielectric material(s). Parallel lines in FIG. 9 represent substantially divergence-free components of the exiting beam, i.e., parallel bundles. Because these beams are substantially divergence free, they lose negligible energy. Hence, the field strength is additive; that is, the field strength produced by n cells each having force $g_0$ would be $ng_0$. The decay in energy of the beam illustrated in FIG. 9 is due to the divergence of the overall beam exiting the aperture 910. The magnitude of applicable voltages and linear charge densities (electric fields) for a cell array are similar to those referred to above with regard to FIG. 1a. Examples of potential applications of a device of this type would be lifting or propulsion of objects. Self propulsion is also a possibility.

Because of symmetry in the case of cylindrical cells, cylindrical mirror cells, and generally any of the longitudinal cells, it suffices to consider a cross section to analyze the spread characteristics of the gravity beam produced by these types of cells.

Turning now to the case of a cylindrical mirror array, for an individual cell (e.g., as depicted in FIG. 7), the strength of the field as a function of the distance R from the array is given by $R_0/R$, where $R_0 \approx L/(2 \tan(\theta/2))$ for $R \gg R_0$. The symbol θ here represents the angle formed by the cylindrical mirror itself. Here, $L \approx nr_0$, where n is the number of cells straddling the aperture 910 in the array and $r_0$ is the width of a single cell. Hence, L approximates the width of the aperture 910 of the array. By way of nonlimiting example, for a cell width of one micron, an array of one million cells would have L=1 meter. L may also take on other values. The decay of the field strength at a distance R from the aperture is thus approximated by 1/R for cylindrical mirror cells.

Turning to the case of cylindrical cells having two dielectric materials (e.g., as shown in FIG. 2b), the decay of the field strength as a function of distance R from the aperture 910 is calculated. This is given by the ratio of the aperture width L to the beam width W at distance R. The symbol 6 represents the angle formed by the material with a high dielectric constant in a cross section of the cell. Hence, $L/W=L/(L+2R \tan(\theta/2))$. For $R \gg L$, this equation reduces to that given for the cylindrical mirror case above.

A conic cell array may also be used to generate a gravitation beam. See, e.g., FIGS. 1a and 1b for an individual cell. The cone angle (i.e., 0) of a single cell may be that defined by the cell geometry, which means the cone angle could be made relatively small. The cone angles are less than 180 degrees, preferably less than several tens of degrees and most preferably less than five degrees. The resulting beam from the lattice will be the superposition of all the exit cones generated by the cells of the lattice with a net angular spread equal to that of a single cell. For example, for a cell diameter equal to ⅛ the radius of curvature, the cone angle, θ, would be approximately 4 degrees. Any object intersecting the full cross-sectional area of the beam would feel the effect of the full force of the beam.

For a conic cell array, the field strength on a mass at a distance R from the lattice would vary approximately as $(R_o/R)^2$ for square or circular cells where: $R_o=nr_0$, $r_o \tan(\theta)$ is the radius of curvature of a circular (cylindrically shaped) array of conic cells (or half the length of the side of a square array of cells), $r_0$ is the cell outer electrode radius of curvature, and n is the number of cells along the radius of a cylindrical array (or half the number along the length of the side of a square array). A square array could have a side length ranging from several millimeters to hundreds of meters. Similarly a circular array could have a radius between several millimeters and hundreds of meters. Although smaller cellular angular, dimensions result in a closer approximation to a divergence-free beam, this divergence of the beam is the very property that gives rise to the gravitational field in the first place. In short, the gravitation beam has a roughly conical shape in embodiments employing a conic cell array. This means that the field will decrease as $1/R^2$, where R is the distance form the aperture, which is an important consideration for some applications.

Architecture for Real-Time Controllable Gravitational Field Patterns

Figure 10:
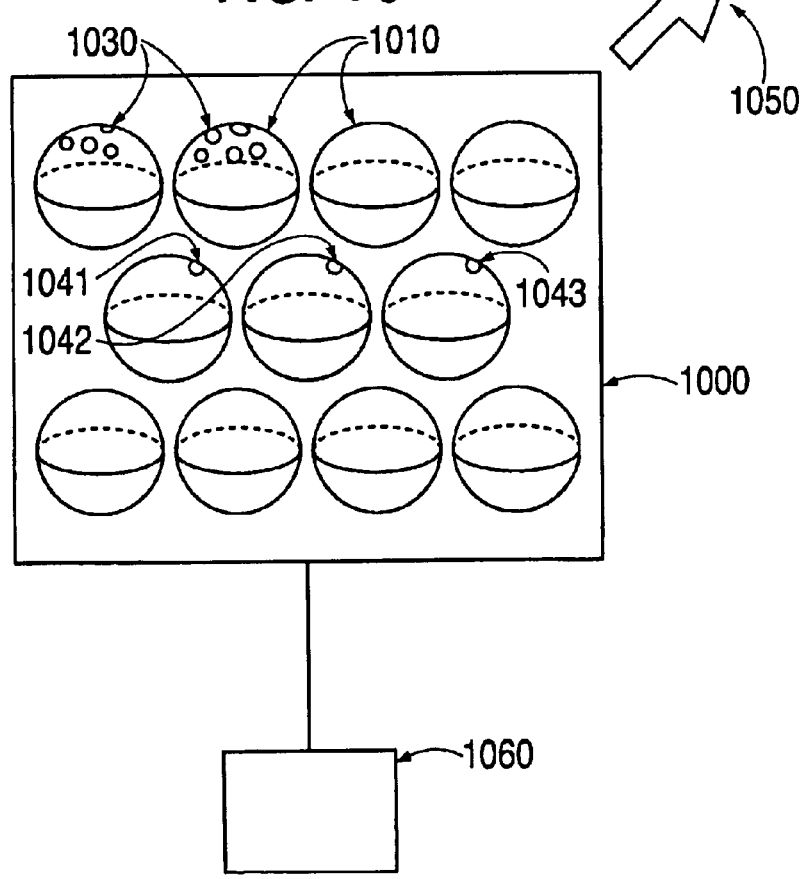
FIG. 10 illustrates a lattice of sub-lattices of independently-controllable conic cells.

FIG. 10 illustrates a real-time controllable gravitational field generator. Programmable gravitational field patterns can be implemented in many different ways, by generating a lattice 1000 whose elements each comprise a sub-lattice 1010 of independently-controllable conic cells 1030. One configuration places a miniature sphere of gravity cells 1030 at each lattice point. The cells 1030 are mounted on the surface of the sphere. By simultaneously applying a voltage to similarly-located cells (e.g., 1041, 1042 and 1043) on each sphere in lattice 1000, a gravitational beam or beams could be controllably generated in any desired direction (e.g., 1050 for corresponding cells 1041, 1042 and 1043) or in multiple directions simultaneously. An application for such a system would be the controllable generation of a beam to impart force on an object or multiple simultaneous beams in the case of multiple objects. The concept can be readily implemented by computer control 1060 of cell activation voltages. Any of the cell types disclosed herein may be employed. The voltages, linear charge densities (electric fields), dimensions, and geometric configurations are discussed in the sections dedicated to the particular cell type used.

Communications

A time-dependent electric field will produce a time-dependent propagation of a gravitational field away from the source at the speed of light with each cyclic reversal. Because of the miniaturization of the capacitor cells, the applied voltage could be varied at frequencies up to and beyond gigahertz. Amplitude or frequency modulating the source voltage using known techniques would produce a communication capability. All presently-recognized matter would be impervious to the gravitational field so generated, so that the Earth, for example, would not impede transmissions. The angular emission pattern could be defined using the lattice techniques described above, so that energy could be focused into a solid angle pattern. The field strength needed for any particular application would be realized by either adding enough cells to the lattice system, or by increasing the applied voltages; and dielectric constant.

The propagating gravitational field would exert an oscillatory force on any material object in its path. However, if the frequency is high enough most matter will not respond appreciably because of inertia. Small charged or uncharged particles would be affected by the field. Free electrons, for example, would be highly responsive to any applied gravitational force. An oscillatory force acting on the free electrons would result in an oscillating current (e.g., in a wire or antenna) oriented along the direction of the propagating gravitational field. The current in the wire would be detectable in a manner similar to that generated by electromagnetic radiation. Preferably, the orientation of the antenna will allow for the projection of a nonzero component of the gravitational field in the direction of the detector. Conventional detector theory would largely apply, and existing detector systems could be used.

The gravitational field can penetrate a conducting shield that would exclude electromagnetic radiation. For example, a conventional radio receiver protected by a Faraday cage cannot detect signals that originate from outside the cage. Gravitational signals, on the other hand, would be detected.

Gravitational signals can penetrate matter such as earth and water. This presents: the possibility of sending gravitational signals to submerged receivers. Submarines and bathyspheres, by way of non-limiting example, could both broadcast and receive signals, enabling two-way wireless communication with stations on dry land. Additionally, gravitational signals could be broadcast through mountains and would be unaffected by most weather conditions.

Figure 11A:
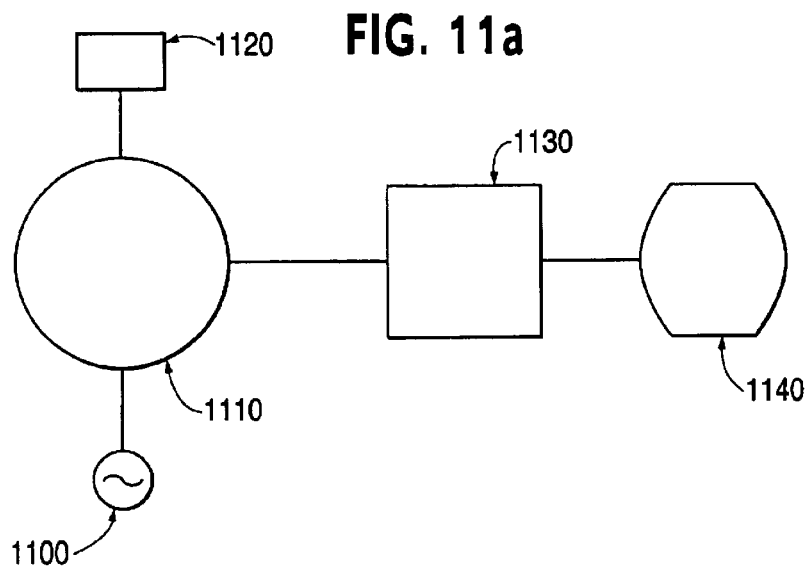
FIG. 11a is a block diagram of a communications system.

FIG. 11*a* is a block diagram of a communications system according to an embodiment of the present invention. The signal source 1100 produces a time-varying voltage signal, which feeds into a modulator 1110. Modulator 1110 receives electrical power from a standard supply 1120 and produces a time-varying electrical carrier signal modulated by the source signal. The modulator 1110 may conventionally modulate amplitude, frequency, phase, or any other modulatable parameter of an electrical signal. Many types of modulation are known in the art and can be used. The output of modulator 1110 is an electrical signal used to control a high-voltage power supply 1130, which provides a time-varying, high voltage signal to field converter 1140.

Figure 11B:
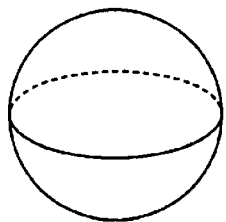
Figure 11C:
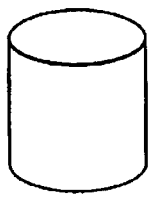
Figure 11D:

Field converter 1140 may include any of the field converter configurations disclosed herein, including individual cells and arrays. Any individual cell type disclosed herein may make up the constituent cells of the arrays shaped according to FIGS. 11*b–d*, including but not limited to conic cells, cylindrical cells, and cylindrical mirror cells. Field converter 1140 generates time-varying gravitational fields that would propagate according to the nature: of the selected cell(s) or arrays. By way of non-limiting example, a spherical array of spherical cells as illustrated in FIG. 11*b* may be used to broadcast in all directions; a cylindrical array of cylindrical cells as illustrated in FIG. 11*c* may be used to broadcast in a substantially two-dimensional pattern; and an the arcuate segment shaped array of FIG. 11*d* may be used to broadcast in a substantially one-dimensional direction. FIG. 11*d* depicts an arc, which is comprised of linear cell segments. That is, the shape is formed by a plurality of longitudinal cells, which are arranged to form an arc as a series straight line shapes. Alternately, the shapes illustrated in FIGS. 11*b–d* may be homogenous metallic members that may be charged (e.g., the charged sphere as discussed above may be used).

Field converter 1140 may also be a single homogeneous capacitor. If a time-dependent voltage is applied to a homogeneous capacitor, for certain frequencies the electric field between the plates will fall off from the center to the edges of the capacitor in a sinusoidal way. This spatial field pattern will give rise to a non-zero derivative of the electric field in a direction parallel to the plates, and will therefore constitute another means of generating gravitational fields.

Figure 12:
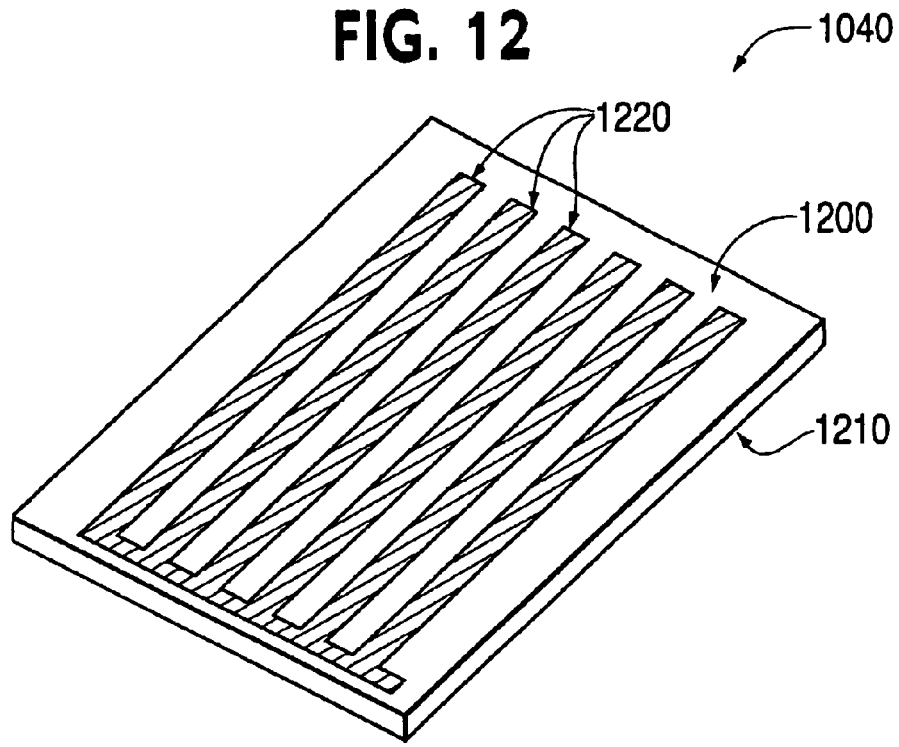
FIG. 12 illustrates a flat array of inhomogeneous capacitors.

FIG. 12 illustrates a field converter 1040 implemented as a flat array of inhomogeneous capacitors. By way of non-limiting example, the array may be constructed from a standard fiberglass printed circuit board, metal clad on both sides 1200, 1210. One electrode would include an entire side 1210 of the circuit board clad in metal. Multiple connected electrodes 1220 are formed by etching the opposite side 1200. The multiple electrodes could comprise a series of strips, squares, rectangles, or any other shape. Strips could range in length from several meters to several millimeters, and range in width from several centimeters to several tens of nanometers. Because the small strips are of different size compared to the opposite metal-clad side, the electric field generated will be inhomogeneous. The voltages and linear charge densities (electric fields) are similar to those discussed above in reference to FIG. 1*a*.

Figure 13:
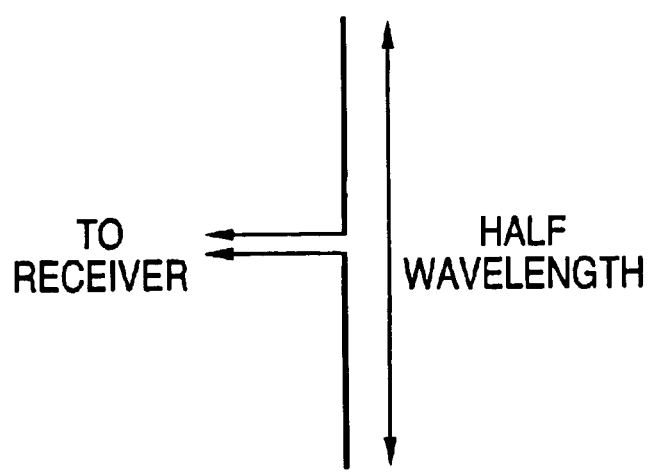
FIG. 13 is a schematic diagram of an antenna suitable for communications applications.

FIG. 13 illustrates a dipole antenna that may be used to receive both electromagnetic and gravitational signals. In the presence of an electromagnetic field, a charge will oscillate along both wires, yielding a potential difference across the gap between the wires. This voltage can be detected, demodulated, amplified, processed if necessary, and output for, communications purposes. The behavior of this antenna in the presence of a gravitational field would be generally the same as for an electromagnetic field, after accounting for differences in amplitude. Due to differences between electromagnetic and gravitational fields, (e.g., the direction of the gravitational field will be parallel to the direction of propagation), the optimal direction configuration for reception of gravity fields is preferably 90 degrees to that of an electromagnetic receiver. The type of antenna used to detect or receive gravitational signals is not limited to dipole antennas. Other types of antennas may be used.

Note that communications using gravitational fields differ from those that behave in accordance with Maxwell's equations of electrodynamics. For example, a pipe array or, cylindrical mirror array can transmit a field whose strength will decay as 1/r, where r is the distance from the broadcasting device. At activation, such a device will generate a gravitational field g(0) at time 0 detected at a distance $r_0$ from the device. If the amplitude of the signal is sinusoidal, the detected field will vary with time t at distance r as:

$$g(r,t)=g(0)e^{ik(t-r/c)}r_0/r$$

where r is the distance from point $r_0$ at the source. There may be departures from the 1/r magnitude rule as r becomes much greater than the dimensions of the array.

The receiver operates by exploiting Newton's law, F=mass×g(r,t). Both neutral and charged particles will experience this force. For the sinusoidal example above, a time dependent current will be generated by free charges moving under the influence of gravitational force, with an associated electric field of E(t)=−∂A/dt, where A is the vector magnetic potential produced by the generated electric current. Preferably the electric current is detected by the receiver; however, other parameters such as voltage may also be detected.

It is noted that the foregoing examples have been provided merely for the purpose of explanation and are in no way to be construed as limiting of the present invention. While the present invention has been described with reference to certain embodiments, it is understood that the words which have been used herein are words of description and illustration, rather than words of limitation. Changes may be made as presently stated and as amended, without departing from the scope and spirit of the present invention in its aspects. Although the present invention has been described herein with reference to particular means, materials and embodiments, the present invention is not intended to be limited to the particulars disclosed herein; rather, the present invention extends to all functionally equivalent structures, methods and uses.

What is claimed is:

1. An apparatus for generating an inhomogeneous electric field comprising:
   a first electrode having an electrically-conductive, open, concave surface characterized by a first radius of curvature;
   a second electrode having an electrically-conductive, convex surface characterized by a second radius of curvature less than or equal to the first radius;
   said second electrode being at least partially concentric with said first electrode;
   said convex and concave surfaces being electrically separated from one another and aligned to generate an inhomogeneous electric field when charged with a voltage potential; and
   said electrodes being charged with a potential difference generating an inhomogeneous electric field of at least about 10,000 volts/millimeter.

2. The apparatus of claim 1 where at least one of the convex and concave surfaces is characterized as a portion of a first hollow sphere.

3. The apparatus of claim 1 where:
   the concave surface is characterized as a portion of a circular cylinder having a central axis; and
   the convex electrode is a conductor extending at least partially along the central axis.

4. An apparatus for generating an inhomogeneous electric field comprising:
   a first electrode having a generally cylindrical cavity with an axis;
   a second electrode positioned at least partially within the cylindrical cavity and electrically separated from the first electrode; and
   at least one material having a dielectric property distributed at least partially between the first and second electrodes;
   wherein the first electrode, second electrode, and at least one material having a dielectric property are aligned to generate an axially non-uniform, inhomogeneous electric field when the first and second electrodes are charged with a voltage potential.

5. An array formed of a plurality of cells, each cell generating an inhomogeneous electric field having an axis along which the inhomogeneous electric field has a maximum magnitude, where the plurality of cells are oriented such that the respective axes of maximum magnitudes are commonly aligned in a converging alignment, thereby forming net electric field having an array-axis along which the net electric field has a maximum magnitude.

6. An array as in claim 5 where at least one cell is an apparatus of claim 1.

7. An array as in claim 5 where at least one cell is an apparatus of claim 3.

8. An array as in claim 5 where at least one cell is an apparatus of claim 4.

9. An apparatus comprised of at least two arrays of claim 5, each array having an array-axis along which the net electric field has a maximum magnitude, where the array-axis of a first array is not parallel with the array axis of a second array.

10. An array as in claim 5 wherein each of the plurality of cells has a first electrode, and the first electrodes of the cells are electrically connected one to another.

11. The apparatus of claim 4 where the first electrode and second electrode are charged with a potential difference generating an inhomogeneous electric field of at least about 10,000 volts/millimeter.

12. The apparatus of claim 1 further comprising a source of a time varying voltage potential connected to said first and second electrodes.

13. The apparatus of claim 3 further comprising a source of a time varying voltage potential connected to said first and second electrodes.

14. The apparatus of claim 4 further comprising a source of a time varying voltage potential connected to said first and second electrodes.

15. A device for generating an inhomogeneous electrical field comprising:
   a first electrode having a first shape being one of: a portion of a sphere, a cone, a paraboloid, a cylinder; a hollow sphere, a hollow cone, a hollow paraboloid, and a hollow cylinder;
   a second electrode being spaced from said first electrode and having a second shape being one of; a portion of a sphere, a cone, a paraboloid, a cylinder, a hollow sphere, a hollow cone, a hollow paraboloid and a hollow cylinder;
   said first and second electrodes being aligned to produce an inhomogeneous electric field when charged with a voltage potential; and
   said first and second electrodes being charged with a voltage potential sufficient to generate a gravitational effect of at least about 100 nano-g's.

* * * * *